US012059897B2

(12) United States Patent
Imamura et al.

(10) Patent No.: US 12,059,897 B2
(45) Date of Patent: Aug. 13, 2024

(54) INKJET RECORDING HEAD AND METHOD FOR PRODUCING SAME

(71) Applicant: CANON KABUSHIKI KAISHA, Tokyo (JP)

(72) Inventors: Isao Imamura, Kanagawa (JP); Yohei Hamade, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 153 days.

(21) Appl. No.: 17/852,641

(22) Filed: Jun. 29, 2022

(65) Prior Publication Data

US 2023/0017960 A1 Jan. 19, 2023

(30) Foreign Application Priority Data

Jul. 9, 2021 (JP) ................................ 2021-114478
Jan. 27, 2022 (JP) ................................ 2022-010686

(51) Int. Cl.
*B41J 2/14* (2006.01)
*B41J 2/16* (2006.01)

(52) U.S. Cl.
CPC ......... *B41J 2/14201* (2013.01); *B41J 2/1607* (2013.01); *B41J 2/1637* (2013.01); *B41J 2002/14419* (2013.01)

(58) Field of Classification Search
CPC .... B41J 2/14201; B41J 2/1607; B41J 2/1637; B41J 2002/14419; B41J 2/1623; B41J 2/1621
See application file for complete search history.

(56) References Cited

U.S. PATENT DOCUMENTS

| | | | |
|---|---|---|---|
| 5,057,854 A | 10/1991 | Pond et al. | |
| 9,458,309 B2 | 10/2016 | Imamura et al. | |
| 10,850,512 B2 | 12/2020 | Imamura | |
| 2017/0145213 A1* | 5/2017 | Nomizu | C08L 79/04 |
| 2021/0221964 A1 | 7/2021 | Imamura et al. | |

FOREIGN PATENT DOCUMENTS

| | | | |
|---|---|---|---|
| JP | 5-24192 A | 2/1993 | |
| JP | 2009-155370 A | 7/2009 | |
| JP | 2011-173970 A | 9/2011 | |
| JP | 2015-206009 A | 11/2015 | |
| JP | 2019-142213 A | 8/2019 | |
| JP | 2019142213 A * | 8/2019 | B41J 2/14201 |

* cited by examiner

*Primary Examiner* — Jannelle M Lebron
(74) *Attorney, Agent, or Firm* — Venable LLP

(57) ABSTRACT

An inkjet recording head comprising a flow channel member, wherein the flow channel member is formed of a heat-cured product of a molding material comprising a resin composition comprising a thermosetting epoxy resin and a curing agent, and a filler; the filler comprises alumina and silica; and with d50 as a median diameter of the silica and with alumina A as the alumina having a median diameter of d50/4 or less, the content of the alumina A is 11 parts by mass or more relative to 100 parts by mass of the silica.

15 Claims, 5 Drawing Sheets

INKJET RECORDING HEAD AND METHOD FOR PRODUCING SAME

BACKGROUND OF THE INVENTION

Field of the Invention

The present disclosure relates to an inkjet recording head and to a method for producing the same.

Description of the Related Art

Electromechanical converters such as piezoelectric elements are known as energy generation elements that generate energy for ejecting ink from an ejection port of a recording head (hereafter also referred to as inkjet recording head) of an inkjet recording device. Besides a method for ejecting ink droplets using an electromechanical converter, known methods include a method for ejecting ink droplets relying on thermal energy, such as a method for ejecting ink droplets by heating up an ink through irradiation of the ink with electromagnetic waves, from a laser or the like, and a method for ejecting ink droplets through heating of a liquid by means of an electrothermal conversion element having a heat resistance element.

Among the foregoing, ejection ports can be arrayed at high density in an inkjet recording head in a method for ejecting ink droplets relying on thermal energy, so that high-resolution recording is made possible as a result. Among the foregoing, the size of an inkjet recording head that utilizes an electrothermal conversion element as an energy generation element can be reduced easily. Furthermore, inkjet recording heads that utilize electrothermal conversion elements are advantageous since such inkjet recording heads can fully exploit the advantages of IC technology and micromachining technology, which have recently witnessed remarkable technological progress and improvements in reliability in the field of semiconductors, and easily afford higher density while being inexpensive to manufacture.

In order to perform recording with yet higher definition, for instance methods have come to be used in which a nozzle for ejecting ink is produced, with high precision, by photolithography. Recent years have also witnessed a demand for realizing an inkjet recording head having a longer recording width for the purpose of achieving high-definition image recording at higher speeds. Specifically, a demand exists for an inkjet recording head that has a length of about 4 inches to 12 inches.

To realize an inkjet recording head having such a long recording width, Japanese Patent Application Publication No. H05-24192 proposes an inkjet recording head that has an appropriate number of nozzles, so that multiple recording element substrates of appropriate length are disposed as a result on a base plate. This inkjet recording head is an inkjet recording head having a long recording width overall. In this case, a base plate member on which ejection pressure generating elements are mounted and to which for instance flow channels are added is required to exhibit high flatness and a coefficient of linear expansion (CTE) low enough so as not to develop stress with a silicon substrate. Further, the base plate member is required to exhibit high ink resistance. That is because elution of impurities or the like in the ink may affect ejection performance adversely, which in unfavorable cases may translate into formation of nozzle-clogging precipitates.

In addition, for instance electromechanical converters such as piezoelectric elements are required to exhibit higher density. Functional members for ejection, pressure chambers and buffers of pressure buffer mechanisms were created by fully exploiting for instance photolithography, the foregoing being then stacked on each other to form a liquid recording element.

As the material of the functional member for ejection there was used silicon, similarly to the substrate, and stainless steel (SUS) excellent in processability, mechanical characteristics and ink resistance, or alumina excellent in CTE, dimensional stability and ink resistance; this resulted in a high-cost member.

It was moreover necessary to arrange, on the base plate, a liquid ejection element formed using such a functional member for ejection; this involved the same problems as above, for instance in that the base plate member was required to exhibit high ink resistance.

Alumina is an instance of a representative material having these characteristics. However, shaping of complex structures and large parts out of alumina is disadvantageous from the viewpoint of manufacturing cost.

In order to produce a base plate member inexpensively, for instance Japanese Patent Application Publication Nos. 2011-173970 and 2009-155370, propose the use of a resin molding material, instead of alumina. Further, Japanese Patent Application Publication No. 2015-206009 describes the use of a molding material by a liquid resin. Further, Japanese Patent Application Publication No. 2019-142213 finds a material that allows achieving both long-term ink resistance and a low CTE.

SUMMARY OF THE INVENTION

In Japanese Patent Application Publication Nos. 2011-173970 and 2009-155370 liquid compositions were prepared using an epoxy resin, for the purpose of formulating a large amount of filler; it was found however that the filler addition amount must be further increased in order to achieve a low CTE on a par with alumina. It was also found that when the filler addition amount is increased, the molding material becomes powdery, in the form of fine granules or powder, and that the epoxy resin and the filler cannot be mixed uniformly. Even with a uniformly mixed molding material, achieved by reducing the filler addition amount, the resin component expands at the time of heating and extrusion during transfer molding, and the resin viscosity decreases, due to the fact that a liquid resin is used. It was found that, as a result, surface precision could not be ensured on account of the rough skin brought about by the separation of the resin and the filler. The inkjet recording heads obtained using the resin molding materials disclosed in Japanese Patent Application Publication Nos. 2011-173970 and 2009-155370 were not necessarily satisfactory in terms of coefficient of linear expansion and filler elution.

The inkjet recording head that utilizes the molding material disclosed in Japanese Patent Application Publication No. 2015-206009, from which there are required further improved long-term reliability and productivity for instance in industrial applications, with the aim of solving the problems of Japanese Patent Application Publication Nos. 2015-206009, 2011-173970 and 2009-155370, exhibited peeling of the treated surface of a surface-treated filler upon immersion in an ink under harsh conditions such as long-term ink storage or in a pressure cooker tester (PCT) or the like, or the filler might elute when exposed at the surface of a molded article, which in unfavorable cases might result in filler slough-off.

In Japanese Patent Application Publication No. 2019-142213 the filler is configured out of alumina, which does not dissolve even upon breakage of a resin thin skin, and accordingly there is no elution from the filler, and the filler does not slough off. However, the CTE of the base plate member disclosed in Japanese Patent Application Publication No. 2019-142213 is about $13\times10^{-6}$° C.$^{-1}$ to $15\times10^{-6}$° C.$^{-1}$. It was accordingly found that the CTE was higher than that of alumina.

Therefore, the present disclosure provides an inkjet recording head capable of achieving both long-term ink resistance and a low CTE, and a method for producing that inkjet recording head.

An inkjet recording head of the present disclosure is an inkjet recording head comprising a flow channel member, wherein the flow channel member is formed of a heat-cured product of a molding material comprising a resin composition comprising a thermosetting epoxy resin and a curing agent, and a filler;

the filler comprises alumina and silica; and with d50 as a median diameter of the silica and with alumina A as the alumina having a median diameter of d50/4 or less, the content of the alumina A is 11 parts by mass or more relative to 100 parts by mass of the silica.

Further, a method for producing an inkjet recording head of the present disclosure is a method for producing an inkjet recording head comprising a flow channel member, wherein the method has a step of forming the flow channel member through injection molding of a molding material comprising a resin composition comprising a thermosetting epoxy resin and a curing agent, and a filler;

the filler comprises alumina and silica; and with d50 as a median diameter of the silica and with alumina A as the alumina having a median diameter of d50/4 or less, the content of the alumina A is 11 parts by mass or more relative to 100 parts by mass of the silica.

Therefore, the present disclosure allows providing an inkjet recording head capable of achieving both long-term ink resistance and a low CTE, and a method for producing that inkjet recording head. Further features of the present invention will become apparent from the following description of exemplary embodiments with reference to the attached drawings.

DESCRIPTION OF THE EMBODIMENTS

Figure 1A:
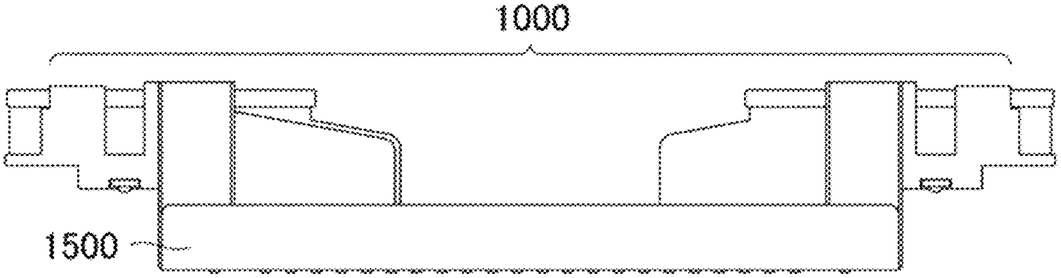
FIG. 1A is a side-view diagram illustrating an example of an inkjet recording head and FIG. 1B is a bottom-view diagram illustrating an example of an inkjet recording head.

Hereinafter, embodiments of the inkjet recording head of the present disclosure and a method for manufacturing the same will be described with reference to accompanying drawings. The inkjet recording head and the production method thereof of the present disclosure are not limited to the following embodiments.

In the present disclosure, the expression of "from XX to YY" or "XX to YY" indicating a numerical range means a numerical range including a lower limit and an upper limit which are end points, unless otherwise specified. When a numerical range is described in a stepwise manner, the upper and lower limits of each numerical range can be arbitrarily combined.

Further, in the following description, configurations having the same function may be given the same reference number in the drawings, and the description thereof may be omitted.

Inkjet Recording Head

Figure 1B:
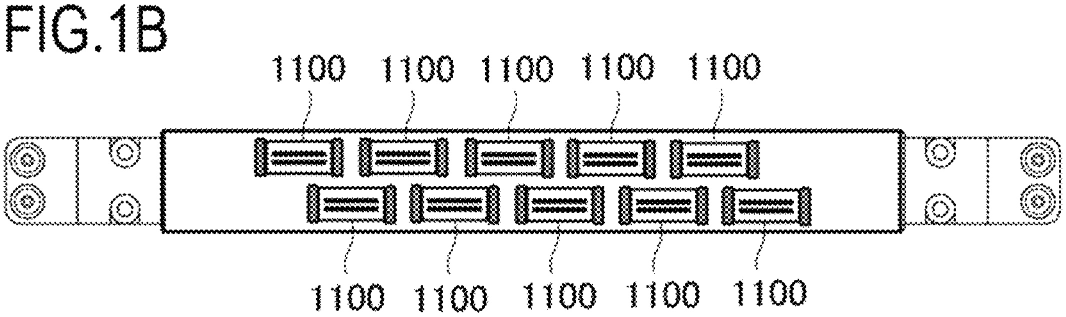
Figure 2:
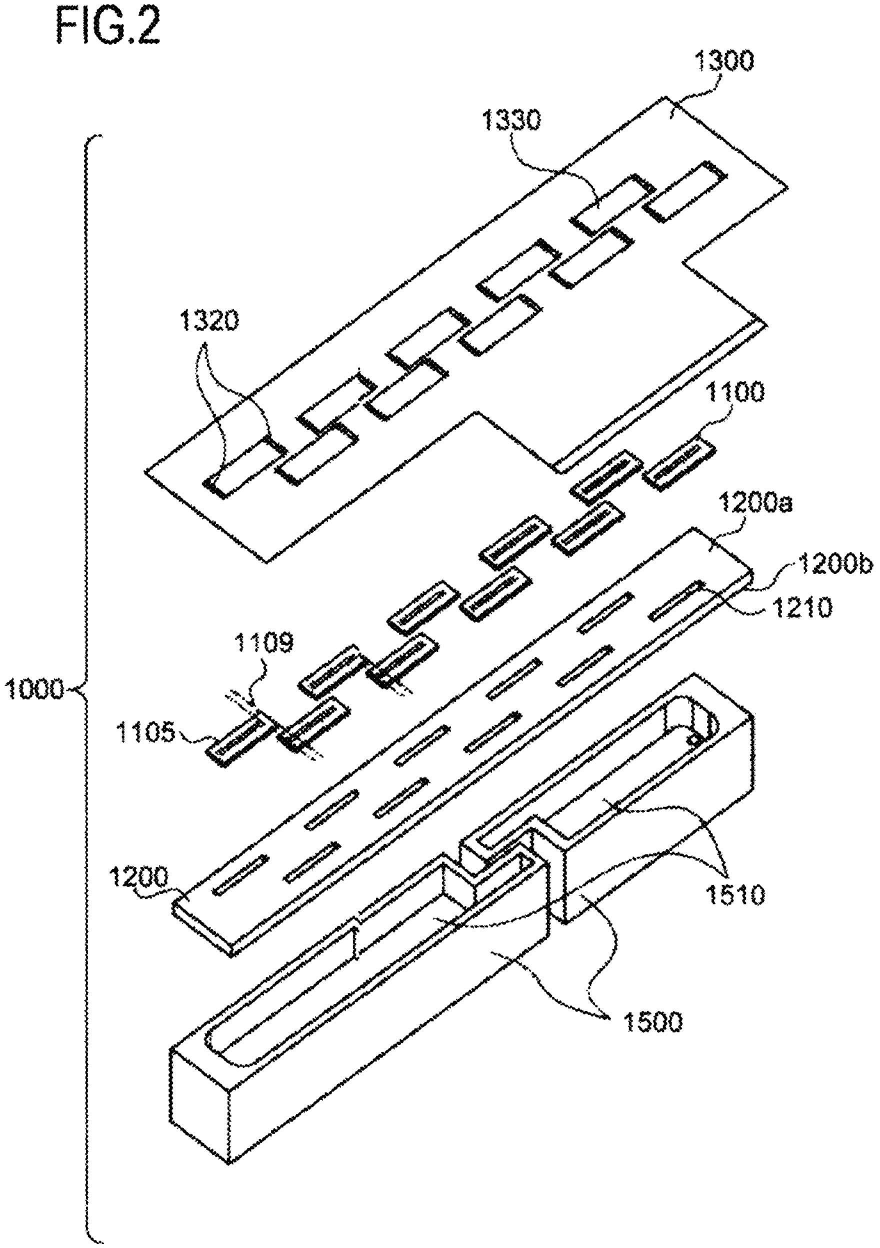
FIG. 2 is an exploded perspective-view diagram illustrating a component configuration of an inkjet recording head.

FIG. 1A is a side-view diagram illustrating an example of an inkjet recording head 1000 to which the present disclosure can be applied and FIG. 1B is a bottom-view diagram illustrating an example of an inkjet recording head 1000 to which the present disclosure can be applied. FIG. 2 is an exploded perspective-view diagram illustrating a component configuration of the inkjet recording head 1000 of FIGS. 1A to 1B.

In the inkjet recording head 1000, nozzle rows are formed within a range that covers the maximum width of a sheet that may conceivably be used. This inkjet recording head is an inkjet full-line inkjet recording head that allows for wide-range recording without scanning by the inkjet recording head.

The inkjet recording head 1000 has recording element substrates 1100 made up of silicon, a liquid supply slit 1210, and a base plate 1200 for supporting the recording element substrates. The inkjet recording head 1000 further has an electrical wiring board 1300 for electrically connecting the recording element substrates and a recording device, liquid storage units 1510, and ink supply members 1500 joined to the base plate 1200. The plurality of recording element substrates 1100, each having an ejection port 1105, are precisely disposed on a main surface 1200*a* of the base plate 1200 in a direction (Y direction) that intersects a recording medium transport direction (X direction). In FIG. 2, the recording element substrates 1100 are alternately disposed in two rows so that end portions 1109 of ejection port groups overlap each other. The ink supply members 1500 are disposed on a surface 1200*b* on the reverse side from that of the main surface 1200*a*. The electrical wiring board 1300 includes electrode terminals 1320 and openings 1330.

The base plate 1200 forms part of a flow channel, and hence it must exhibit high resistance to liquids such as ink. For instance, when the material of the base plate elutes, even at few ppm, into a liquid such as ink, a precipitate becomes adhered near the ejection port as the liquid such as ink evaporates in the vicinity of the ejection port. As a result, the ejected droplets may twist, and printing defects may arise. The base plate 1200 is joined to the recording element substrates 1100 formed of silicon or the like for instance by way of an adhesive, and thus high dimensional precision is required; accordingly, the CTE of the base plate 1200 is preferably low.

In the present disclosure, therefore, a flow channel member such as the base plate 1200 is formed of a heat-cured product of a molding material comprising a resin composition that comprises a thermosetting epoxy resin and a curing agent, and a filler;

the filler comprises alumina and silica; and with d50 as a median diameter of the silica and with alumina A as the alumina having a median diameter of d50/4 or less, a content of the alumina A can be set to 11 parts by mass or more relative to 100 parts by mass of the silica.

The flow channel member such as the base plate 1200 is formed by injection-molding of a molding material comprising a resin composition that comprises a thermosetting epoxy resin and a curing agent, and a filler, wherein the filler comprises alumina and silica; and with d50 as a median diameter of the silica and with alumina A as the alumina having a median diameter of d50/4 or less, instances where a content of the alumina A is set to 11 parts by mass or more relative to 100 parts by mass of the silica are suitable in terms of mass productivity of the inkjet recording head of the present disclosure.

Silica has a low CTE of several$\times10^{-6}$° C.$^{-1}$; among silica, fused silica has a particularly low CTE of about $0.5\times10^{-6}$° C.$^{-1}$, and hence fused silica is an effective material for reducing the CTE of a molding material. However, silica elutes readily into ink. By contrast, the CTE of alumina is about $7.5\times10^{-6}$° C.$^{-1}$, but alumina does not elute readily into the ink.

In the inkjet recording head of the present disclosure, therefore, a flow channel member is formed using a molding material that comprises alumina and silica as a filler, and that comprises 11 parts by mass or more of alumina (hereafter such an alumina will be particularly referred to as "alumina A") having a median diameter that is ¼ or less the median diameter of the silica, relative to 100 parts by mass of silica. Through the use of such a molding material the filler becomes disposed so that the alumina A envelops the silica. The inventors consider that alumina A that envelops silica allows suppressing elution of the silica into the ink, even if the silica is added in an amount such that CTE is sufficiently reduced, and allows combining both long-term ink resistance and low CTE.

The material according to the present disclosure exhibits a sufficiently low CTE, and little elution of silica into a liquid such as ink. That is because the silica filler does not elute readily by virtue of the fact that the particle diameters of the silica and alumina are controlled so that silica is enveloped by alumina of small particle diameter.

As described above, the molding material of the present disclosure has a high filler content ratio and a low CTE, while the molding shrinkage factor of the obtained molded article is very small. For instance, the molding shrinkage factor can be set to 1% or lower, preferably 0.5% or lower, and more preferably 0.03% or lower. When silica and alumina are combined, the flowability within the mold at the time of molding is better, and fillability is likewise superior, as compared with a case where silica and alumina are used singly. In addition, the molding material of the present disclosure allows increasing precision at the time of molding, and enables for instance molding at a precision of about 10 μm.

As a result, the molding material of the present disclosure is suitable for precision parts. The molding material of the present disclosure enables molding also in instances where photolithography or laser processing is conventionally resorted to, and accordingly allows molding also a member having an ejection function of a recording element. That is, the flow channel member formed by the molding material of the present disclosure may be provided with a segment that fulfills an ejection function, and can be made into a member having an ejection function, in a step of forming a flow channel member.

The ejection function denotes a function directly or indirectly necessary for ejection of a liquid. The member having an ejection function denotes a member having a segment that elicits an ejection function. Examples of segments that elicit an ejection function include for instance a buffer chamber that curtails ejection vibration, an ink chamber that supplies ink, and a pressure chamber that generates ejection pressure.

Figure 5A:
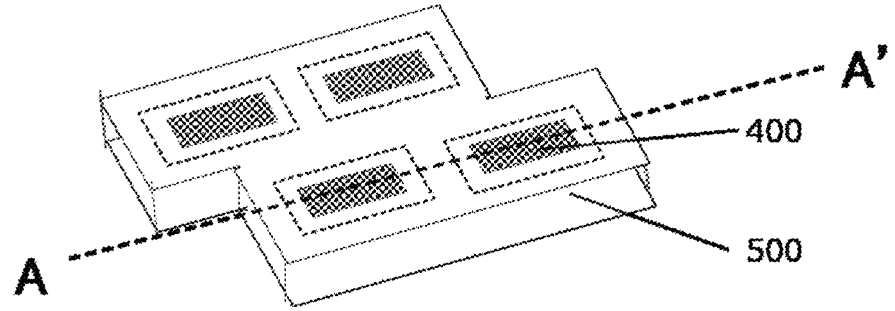
FIGS. 5A to 5C are explanatory diagrams of an inkjet recording head according to one aspect of the present disclosure.
Figure 5B:
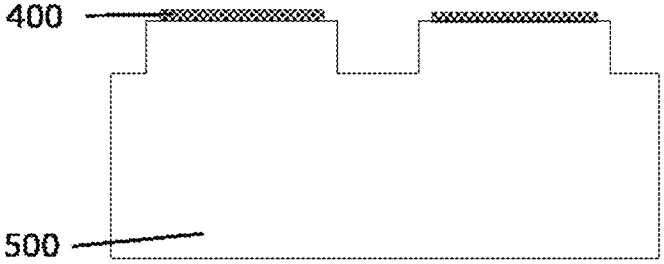
Figure 5C:
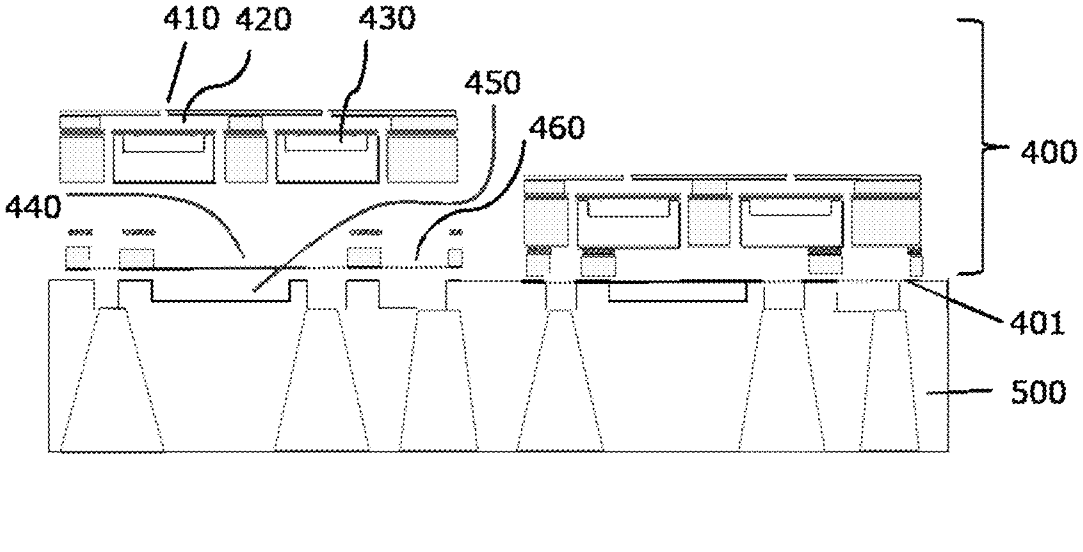

A member in which a base plate is molded into a certain shape, to thereby impart an ejection function to the base plate, as in FIG. 5C, is an illustrative instance of a member having an ejection function of a recording element. Herein the molding shape is not particularly limited, so long as the base plate can be imparted with an ejection function. Examples include for instance an implementation in which the base plate has at least one portion from among a protruded portion and a depressed portion; preferably, the base plate has a depressed portion.

In a case where the base plate is molded so as to have a depressed portion, this depressed portion is preferably cuboid in shape. Although the required dimensions vary depending on the ejection design, in a case where the depressed portion is cuboid, the depth of the depressed portion (the length of the cuboid in the vertical direction when the base plate lies on a horizontal plane) is preferably from 50 μm to 300 μm.

The length of the inner wall of the depressed portion (i.e. the length of the inner wall of the depressed portion in the longitudinal direction of the base plate (that is, the direction of the dashed line A-A' in FIG. 5A)) is preferably from 50 μm to 40000 μm.

Further, the width of the inner wall of the depressed portion (the length of the inner wall of the depressed portion in a direction perpendicular to both the depth direction and the length direction) is preferably from 50 μm to 3000 μm.

The constituent components of the resin composition according to the present disclosure will be explained below.

The resin composition contains a thermosetting epoxy resin. A known thermosetting epoxy resin can be used, without particular limitations, as the thermosetting epoxy resin; examples thereof include for instance bisphenol A-type epoxy resins, bisphenol F-type epoxy resins and bisphenol AD-type epoxy resins, as well as compounds resulting from addition of alkylene oxides to the foregoing; epoxy novolac resins; glycidyl ether-type epoxy resins such as bisphenol A novolac diglycidyl ether and bisphenol F novolac diglycidyl ether; and also glycidylamine-type epoxy resins and alicyclic epoxy resins. A solid epoxy resin can be used, besides a liquid epoxy resin, as the thermosetting epoxy resin. Examples of solid epoxy resins include epoxy resins having a biphenyl skeleton, a naphthalene skeleton, a cresol novolac skeleton, a trisphenolmethane skeleton, a dicyclopentadiene skeleton, a phenol biphenylene skeleton or a triphenyl skeleton.

Among the foregoing there is preferably used an epoxy resin having a dicyclopentadiene skeleton, from the viewpoint of dimensional changes derived from moisture absorption or water absorption. From the viewpoint of achieving a higher glass transition point and yet better ink resistance, there is preferably used an epoxy resin having a naphthalene skeleton, an epoxy resin having a cresol novolac skeleton, or an epoxy resin having a triphenyl skeleton; more preferably, the resin is a triphenyl-type epoxy resin having a triphenyl skeleton. Using a phenolic resin as the epoxy resin is likewise a preferred implementation.

The thermosetting epoxy resin may be used as a single type; alternatively, two or more types thereof may be used concomitantly. Further, the thermosetting epoxy resin may exhibit not only thermosetting properties but also photocuring properties. Also the resin composition may contain an epoxy resin other than the thermosetting epoxy resin.

The resin composition contains a curing agent. Known curing agents can be used, without particular limitations, as the curing agent; for instance amines, polyamides, acid anhydrides, imidazoles and phenols can be used herein. Curing agents that improve pot life and reactivity through addition of an epoxy resin thereto can also be used. A low-viscosity compound having latency is preferably used as the curing agent. Examples of low-viscosity curing agents having latency include acid anhydrides such as tetrahydrophthalic anhydride, methyltetrahydrophthalic anhydride, hexahydrophthalic anhydride, methylhexahydrophthalic anhydride, methylnadic anhydride, hydrogenated methylnadic anhydride and trialkyltetrahydrophthalic anhydride; and imidazoles such as 2-ethyl-4-methylimidazole and 1-(2-cyanoethyl)-2-ethyl-4-methylimidazole. Also a solid curing agent can be used, besides a liquid curing agent, as the curing agent. Examples of solid curing agents include phenolic resins such as xylylene novolac, biphenyl novolac, phenol novolac and dicyclopentadienephenol novolac.

Among the foregoing, trialkyltetrahydrophthalic anhydride is preferably used from the viewpoint of dimensional changes derived from moisture absorption or water absorption. A liquid imidazole is preferably used, from the viewpoint of latency and reactivity. The term liquid imidazole denotes an imidazole that is liquid at normal temperature (15° C. to 35° C.). Examples of the liquid imidazole include 1,2-dimethylimidazole, 2-ethyl-4-methylimidazole and 1-benzyl-2-methylimidazole. When a phenolic resin (more preferably phenol novolac) is used as the curing agent, the wettability of the resin composition towards the filler improves, and the resin composition and the filler are firmly bonded to each other, thanks to which long-term ink resistance is further improved.

These curing agents may be used as a single type; alternatively, two or more types thereof may be used concomitantly.

The resin composition may contain a curing catalyst. Examples of the curing catalyst include tertiary amines, boron trifluoride amine complexes and cationic polymerization catalysts. These curing catalysts may be used as a single type; alternatively, two or more types thereof may be used concomitantly.

The resin composition may contain a curing accelerator. Examples of curing accelerators include imidazole, tetraethylammonium bromide, tetraphenylphosphonium bromide, 1,8-diaza-bicyclo-(5,4,0)-undecene-7,2-ethylhexanoate and triphenylsulphone. These curing accelerators may be used as a single type; alternatively, two or more types thereof may be used concomitantly.

The resin composition may contain a silane coupling agent, from the viewpoint of adhesion to the filler. Examples of the silane coupling agent include γ-glycidoxypropyltrimethoxysilane, β-(3,4-epoxycyclohexyl)-ethyltrimethoxysilane, γ-mercaptopropyltriethoxysilane and γ-aminopropyltrimethoxysilane. These silane coupling agents may be used as a single type; alternatively, two or more types thereof may be used concomitantly. A titanate-based or aluminate-based coupling agent may also be used.

Various constituent components suitable as a molding material will be explained next.

The resin composition contains for instance a thermosetting epoxy resin (for instance a thermosetting epoxy resin that is solid at normal temperature) as a main agent, a phenolic resin (for instance a phenolic resin that is solid at normal temperature) as a curing agent, alumina and silica as a filler, a curing accelerator, and a silane agent. Each component contained in the resin composition may be a liquid or a solid. Also an epoxy resin other than the main agent, and that is ordinarily added as needed for the purpose of modification, as the case may require, may be liquid or may be solid. The resin composition preferably has a melting point of 50° C. or higher, in terms of storage stability and handleability.

The melting point of the thermosetting epoxy resin is preferably 50° C. or higher, and more preferably lies in the range from 50° C. to 120° C. Examples of the thermosetting epoxy resin include alicyclic epoxies of naphthalene skeleton type, cresol novolac type, triphenyl type, biphenyl type, dicyclopentadiene type, naphthol skeleton type, bisphenol novolac type, glycidylamine type and phenol biphenylene type, and also alicyclic epoxies. These epoxy resins may be used as a single type; alternatively, two or more types thereof may be used concomitantly.

A polyfunctional epoxy resin can be preferably used, among thermosetting epoxy resins, from the viewpoints of ink resistance, adhesion to the filler, and molding cycle. Among the foregoing, triphenyl-type epoxy resins exhibit a high glass transition point in combination with a curing agent (in particular a phenolic resin), and allow forming a molded body having excellent ink resistance; accordingly, triphenyl-type epoxy resins can be suitably used as a flow channel member.

The thermosetting epoxy resin preferably has a melting point of 50° C. or higher, and more preferably a melting point in the range from 50° C. to 120° C. Examples of the curing agent include phenolic resins of for instance phenol novolac type, xylylene novolac type, bis A novolac type, triphenylmethane novolac type, biphenyl novolac type or dicyclopentadiene type. These curing agents may be used as a single type; alternatively, two or more types thereof may be used concomitantly.

A phenolic resin or a polyfunctional resin (more preferably, a polyfunctional phenolic resin) can be preferably used, among the curing agents, in terms of ink resistance, adhesion to the filler, and molding cycle. Through the use of a phenolic resin or a polyfunctional resin (more preferably a polyfunctional phenolic resin) as a curing agent in the present disclosure, the wettability of the resin composition towards a filler is improved, and the resin composition and the filler bond firmly to each other, thanks to which long-term ink resistance becomes further improved.

The total content of the thermosetting epoxy resin and the curing agent in the molding material is preferably from 8 mass % to 30 mass %, more preferably from 9 mass % to 15 mass %. The total content of the thermosetting epoxy resin and the curing agent in the heat-cured product is preferably from 8 mass % to 30 mass %, more preferably from 9 mass % to 15 mass %. In a preferred implementation, both the thermosetting epoxy resin and the curing agent are polyfunctional.

The curing agent ordinarily has low reactivity, and accordingly is preferably used in combination with at least one selected from the group consisting of a curing accelerator and a curing catalyst. Further, the molding material contains a curing accelerator and a curing catalyst, and as a result also epoxy groups that have not reacted with hydroxyl groups can drive the reaction forward, such that the molded article is unlikelier to contain an unreacted component, which translates into improved ink resistance. Examples of such a curing accelerator include imidazoles such as 2-ethyl-4-methylimidazole and 1-(2-cyanoethyl)-2-ethyl-4-methyl-imidazole, as well as tertiary amines and triphenylphosphines. Examples of such a curing catalyst include curing catalysts similar to those listed above. These curing accelerators and curing catalysts may each be used as a single type; alternatively, two or more types thereof may be used concomitantly.

The total content of the curing accelerator and the curing catalyst in the molding material is preferably from 0.01 mass % to 0.50 mass %, more preferably from 0.10 mass % to 0.30 mass %. The total content of the curing accelerator and the curing catalyst in the heat-cured product is preferably from 0.01 mass % to 0.50 mass %, more preferably from 0.10 mass % to 0.30 mass %.

The resin composition may contain a flow improver. Examples of the flow improver include carnauba wax. The content of the flow improver in the molding material is preferably from 0.01 mass % to 0.50 mass %, more preferably from 0.10 mass % to 0.30 mass %. The content of the flow improver in the heat-cured product is preferably from 0.01 mass % to 0.50 mass %, more preferably from 0.10 mass % to 0.30 mass %.

The molding material according to the present disclosure comprises the resin composition and the filler according to the present disclosure. Further, the filler comprises silica (preferably fused silica) from the viewpoint of achieving a low CTE, and alumina from the viewpoint of suppressing elution of silica into the ink. Herein with d50 as a median diameter of the silica and with alumina A as the alumina having a median diameter of d50/4 or less, a content of the alumina A is 11 parts by mass or more relative to 100 parts by mass of the silica.

The content of the alumina A relative to 100 parts by mass of the silica is preferably 15 parts by mass or more, and more preferably 20 parts by mass or more. The upper limit of the content is not particularly restricted, but may be for instance 250 parts by mass or less. The content is particularly preferably about 24 parts by mass (specifically, from 23 parts by mass to 25 parts by mass).

Preferably, at least one selected from the group consisting of alumina and silica is spherical, for the purpose of curtailing the CTE and for the purpose of eliciting high filling. Two or more types of alumina having different particle diameters may be combined, in order to achieve closest packing in the alumina. Further, two or more types of silica having different particles diameters may be combined, in order to achieve closest packing in the silica.

The median diameter of silica is preferably from 15 μm to 50 μm, more preferably from 23 μm to 25 μm. The median diameter of alumina is preferably from 0.5 μm to 20 μm, more preferably from 0.5 μm to 10 μm, and yet more preferably from 0.5 μm to 6 μm.

Further, the mass-basis ratio of silica and alumina is preferably silica:alumina=1:9 to 9:1, and more preferably 7:3 to 2:8. In another preferred implementation, the content of alumina is 420 parts by mass or less relative to 100 parts by mass of silica. When the proportion of alumina and silica in the filler lies within the above range, sufficient alumina A can be disposed around the silica, the proportion of silica exposed on the surface of the molded article drops, and elution of silica into the ink is further suppressed. It becomes moreover possible to achieve both better ink resistance and a lower CTE.

Preferably, the median diameter of the filler as a whole is 50 μm or less, and is more preferably from 5 μm to 20 μm. When the median diameter of the filler as a whole is 50 μm or less, the fillability of fine portions further improves, and flowability during molding likewise improves. Preferably, the median diameter of alumina is smaller than the median diameter of silica; when the median diameter of alumina is about 5 μm or less, the specific surface area thereof increases and curing characteristics are improved, but the flowability at the time of molding is impaired. However, flowability at the time of molding is supplemented by the silica having a larger median diameter than the median diameter of alumina.

The term median diameter in the present disclosure signifies d50, which is the particle diameter at a cumulative value of 50% in a number-basis particle size distribution by a general laser diffraction/scattering method.

In a case where two or more types of alumina having different particle diameters are combined as the alumina in the filler, d50 is worked out from the particle size distributions of the respective alumina types, and then the obtained values of d50 are multiplied by the content ratios of the respective alumina types, whereupon the value obtained by adding the resulting products is taken as the median diameter of the alumina in the filler.

The same is true in a case where the silica in the filler is a combination of two or more types of silica having different particle diameters.

The content of the filler in the heat-cured product is preferably from 70.0 mass % to 92.0 mass %, more preferably from 85.0 mass % to 91.0 mass %, from the viewpoint of combining ink resistance, and coefficient of linear expansion, with ease of handling at the time of molding. The content of the filler in the molding material is preferably from 70.0 mass % to 92.0 mass %, more preferably from 85.0 mass % to 91.0 mass %, from the viewpoint of combining ink resistance, and coefficient of linear expansion, with ease of handling at the time of molding.

Preferably, at least one selected from the group consisting of alumina and silica is treated with a silane coupling agent for the purpose of improving adhesion to the resin component. In this case the use amount of the silane coupling agent is preferably from 0.01 parts by mass to 0.06 parts by mass, and more preferably from 0.02 parts by mass to 0.04 parts by mass, relative to 100 parts by mass of the filler to be processed. Examples of the silane coupling agent include γ-glycidoxypropyltrimethoxysilane, β-(3,4 epoxycyclohexyl)-ethyltrimethoxysilane, γ-mercaptopropyltriethoxysilane and γ-aminopropyltrimethoxysilane. A titanate-based or aluminate-based coupling agent may also be used. These silane coupling agents may be used as a single type; alternatively, two or more types thereof may be used concomitantly.

EXAMPLES

The molding material according to the present disclosure will be explained below on the basis of examples and comparative examples, but the present disclosure is not limited to the features embodied in these examples. Unless otherwise noted, the language “parts” refers to parts by mass.

Production of a Molding Material

Molding materials 1 to 17 set out in Tables 1 and 2 were prepared. Specifically, the epoxy resins, curing agents, curing accelerators (curing catalysts) and flow improvers given in Tables 1 and 2 were mixed in the compounding amounts given in Tables 1 and 2, and thereafter each respective mixture was stirred while the filler was added thereto in small amounts. The materials were mixed using a mixer, and a heat-melting and mixing treatment was carried out using a thermal roll and a kneader; the resulting product was then cooled, solidified and pulverized, and filtering was performed, so that particle diameter was uniform, and obtain a molding material. The following evaluations were performed on the molding material. The results are also given in Tables 1 and 2.

Among the fillers used as the filler, those notated in the Tables 1 and 2 as being silane-treated were subjected to a treatment with a silane coupling agent as follows.

Herein 10,000 parts of filler were changed into a Henschel mixer, and then a solution made up of 3 parts of a silane coupling agent (product name: A-187, by Momentive Performance Materials Inc.) and 400 parts of ethanol was further charged, while under stirring at 700 rpm. Stirring was then performed for 5 minutes. Steam was introduced upon confirmation that the whole had become a uniform viscous solution. Once the solvent was evaporated by the steam, the stirring rotational speed was set to 1400 rpm, the whole was held at 100° C. for 5 minutes, and was then cooled, to thereby treat the filler with the silane coupling agent.

Figure 3:
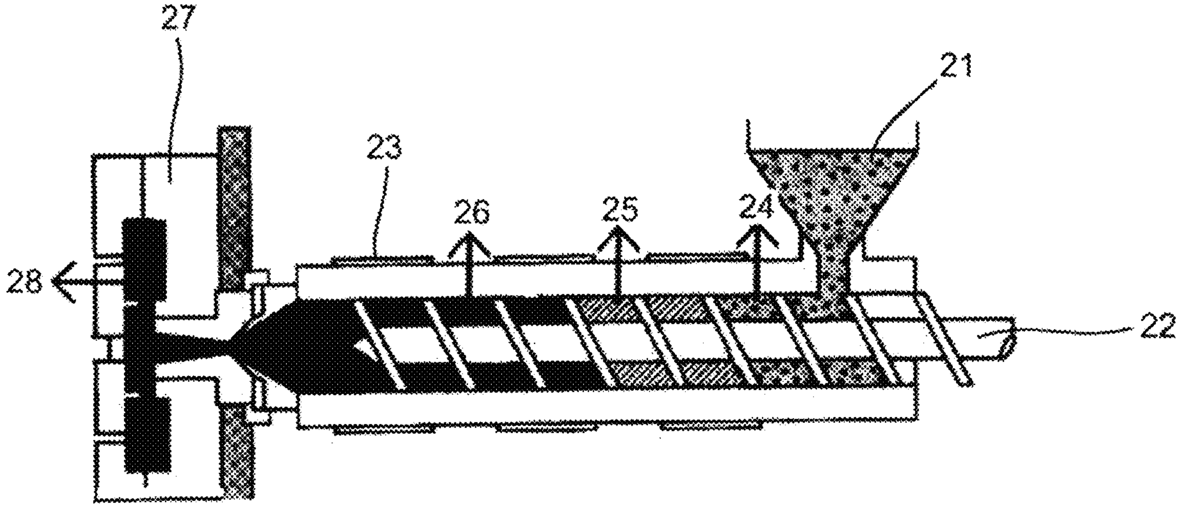
FIG. 3 is a schematic diagram illustrating an injection molding machine used in an embodiment.

Each obtained molding material was injection-molded in the following steps using the injection molding machine illustrated in FIG. 3.

The molding material was charged from a hopper 21. The charged molding material was extruded towards a mold 27 by the screw 22. The molding material was heated by a heater 23 while being pushed, whereupon the molding material changed from the solid state 24 to the liquid state 26, through a sticky state 25. The liquid-state material 26 was extruded into in the high-temperature mold 27, where the material underwent curing to yield a molded article 28.

The setting conditions of the injection molding machine are as follows. Herein a 40 mm×40 mm×3 mm flat plate was molded under conditions of 175° C. for 2 minutes using an injection molding machine (product name: EC75SXR, by Toshiba Machine Co., Ltd.).

Each molding material was injection-molded under the above conditions and in accordance with the above method, to yield a respective molded article. Additional heat curing was performed at 180° C. for 8 hours on the obtained molded article, after which the physical properties were measured and ink resistance was evaluated as follows.

Measurement of Physical Properties

The CTE and Tg of each obtained molded article were worked out in accordance with a TMA method using TMA/SS6100 by SII NanoTechnology Inc. The results are given in Tables 1 and 2.

Evaluation of Ink Resistance

Each obtained molded article was immersed in a transparent ink for distribution (distribution ink for inkjet printers) (product name: F850, by Canon Inc.), to a mass ratio of ink:molding material=20:1, and the whole was heated at 121° C. for 10 hours using a PCT. After air cooling down to normal temperature, the degree of silica elution from the molded article into the ink was evaluated by quantitative analysis of silicon (Si) in the ink, using an ICP emission spectrometer (ICPE-9820 by Shimadzu Corporation).

After being air-cooled, the molded article was allowed to stand for 1 week, after which there was observed whether alumina had shed off the molded article. The evaluation criteria are as follows.

A: no observable precipitate of shed alumina.

B: a small amount of shed alumina precipitate can be observed.

C: a large amount of shed alumina precipitate can be observed.

Also a molded article for which neither silicon elution nor alumina precipitation was observed was allowed to stand for 1 week, and was further heated at 121° C. for 250 hours using a PCT, whereupon the occurrence or absence of silicon elution and alumina shedding was observed. The results are given in Tables 1 and 2.

TABLE 1

| Material classification | Material name | Product name | Example (parts) R.C. 1 | R.C. 2 | R.C. 3 | R.C. 4 | R.C. 5 |
|---|---|---|---|---|---|---|---|
| Epoxy resin | Naphthalene skeleton | NC-7300L (by Nippon Kayaku Co., Ltd.) Melting point: 74° C. | 100 | — | — | — | — |
| | Cresol novolac type | EOCN-1020 (by Nippon Kayaku Co., Ltd.) Melting point: 62° C. | — | 100 | — | — | — |
| | Triphenyl polyfunctional | EPPN-502H (by Nippon Kayaku Co., Ltd.) Melting point: 67° C. | — | — | 100 | 100 | 100 |
| Curing agent | Phenol novolac | BRG-557 (by Aica SDK Phenol Co., Ltd.) Melting point: 86° C. | 43 | 48 | 55 | 55 | 55 |
| Curing accelerator/ curing catalyst | Triphenylsulfone (TPP, Melting point: 80° C.) | | 2 | 2 | 2 | 2 | 2 |
| Filler | Alumina median diameter: 20 μm | DMA-20 (by Denka Co., Ltd.) | 514 | 530 | 560 | — | — |
| | Alumina median diameter: 5 μm | DMA-05A (by Denka Co., Ltd.) | 386 | 400 | 416 | 139 | 277 |
| | Alumina (*silane treated) median diameter: 20 μm | DMA-20 (by Denka Co., Ltd.) | — | — | — | — | — |
| | Alumina (*silane treated) median diameter: 5 μm | DMA-05A (by Denka Co., Ltd.) | — | — | — | — | — |
| | Fused silica (*silane-treated) median diameter: 24 μm | FB-950 (by Denka Co., Ltd.) | 386 | 400 | 416 | 1243 | 1155 |

TABLE 1-continued

| | | | | | | | | |
|---|---|---|---|---|---|---|---|---|
| | Fused silica (*silane-treated) median diameter: 5 μm | FB-5D (by Denka Co., Ltd.) | | — | — | — | — | — |
| | Alumina (*silane treated) median diameter: 0.6 μm | AO-502 (by Admatechs Co., Ltd.) | | — | — | — | — | — |
| Flow improver | Carnauba wax | Carnauba wax (by Cerarica NODA Co., Ltd.) | | 2 | 2 | 2 | 2 | 2 |
| | Total amount (parts) | | | 1433 | 1482 | 1551 | 1541 | 1591 |
| | Total amount of filler (parts) | | | 1286 | 1330 | 1392 | 1382 | 1432 |
| | Filler content (mass %) | | | 89.7 | 89.7 | 89.7 | 89.7 | 90.0 |
| Alumina and silica | Alumina:silica (mass ratio) | | | 7:3 | 7:3 | 7:3 | 1:9 | 2:8 |
| | Number of alumina parts per silica 100 parts | | | 233 | 233 | 235 | 11 | 24 |
| Alumina A and silica | Alumina A:silica (mass ratio) | | | 1:1 | 1:1 | 1:1 | 1:9 | 2:8 |
| | Number of parts of alumina A per 100 silica parts | | | 100 | 100 | 100 | 11 | 24 |
| Evaluation | Tg(° C.) | TMA method | | 143 | 153 | 170 | 170 | 170 |
| | CTE(×10$^{-6}$° C.$^{-1}$) | TMA method | | 9.4 | 9.3 | 8.9 | 7.5 | 7.8 |
| | Ink resistance | 121° C., 10 hr | Si elution (ppm) | ND | ND | ND | ND | ND |
| | | | Alumina shedding | A | A | A | A | A |
| | | Further 121° C., 250 hr | Si elution (ppm) | 0.01 | 0.01 | 0.01 | 0.13 | 0.03 |
| | | | Alumina shedding | C | C | B | B | B |

| Material classification | Material name | Product name | | Example (parts) R.C. 6 | R.C. 7 | R.C. 8 | R.C. 9 |
|---|---|---|---|---|---|---|---|
| Epoxy resin | Naphthalene skeleton | NC-7300L (by Nippon Kayaku Co., Ltd.) Melting point: 74° C. | | — | — | — | — |
| | Cresol novolac type | EOCN-1020 (by Nippon Kayaku Co., Ltd.) Melting point: 62° C. | | — | — | — | — |
| | Triphenyl polyfunctional | EPPN-502H (by Nippon Kayaku Co., Ltd.) Melting point: 67° C. | | 100 | 100 | 100 | 100 |
| Curing agent | Phenol novolac | BRG-557 (by Aica SDK Phenol Co., Ltd.) Melting point: 86° C. | | 55 | 55 | 55 | 55 |
| Curing accelerator/ curing catalyst | Triphenylsulfone (TPP, Melting point: 80° C.) | | | 2 | 2 | 2 | 2 |
| Filler | Alumina median diameter: 20 μm | DMA-20 (by Denka Co., Ltd.) | | — | 560 | — | — |
| | Alumina median diameter: 5 μm | DMA-05A (by Denka Co., Ltd.) | | 691 | 595 | — | — |
| | Alumina (*silane treated) median diameter: 20 μm | DMA-20 (by Denka Co., Ltd.) | | — | — | — | — |
| | Alumina (*silane treated) median diameter: 5 μm | DMA-05A (by Denka Co., Ltd.) | | — | — | 277 | — |
| | Fused silica (*silane-treated) median diameter: 24 μm | FB-950 (by Denka Co., Ltd.) | | 691 | 277 | 1155 | 1155 |
| | Fused silica (*silane-treated) median diameter: 5 μm | FB-5D (by Denka Co., Ltd.) | | — | — | — | — |
| | Alumina (*silane treated) median diameter: 0.6 μm | AO-502 (by Admatechs Co., Ltd.) | | — | — | — | 277 |
| Flow improver | Carnauba wax | Carnauba wax (by Cerarica NODA Co., Ltd.) | | 2 | 2 | 2 | 2 |
| | Total amount (parts) | | | 1541 | 1591 | 1591 | 1591 |
| | Total amount of filler (parts) | | | 1382 | 1432 | 1432 | 1432 |
| | Filler content (mass %) | | | 89.7 | 90.0 | 90.0 | 90.0 |
| Alumina and silica | Alumina:silica (mass ratio) | | | 5:5 | 8:2 | 2:8 | 2:8 |
| | Number of alumina parts per silica 100 parts | | | 100 | 417 | 24 | 24 |
| Alumina A and silica | Alumina A:silica (mass ratio) | | | 1:1 | 8:2 | 2:8 | 2:8 |
| | Number of parts of alumina A per 100 silica parts | | | 100 | 215 | 24 | 24 |
| Evaluation | Tg(° C.) | TMA method | | 170 | 170 | 170 | 170 |
| | CTE(×10$^{-6}$° C.$^{-1}$) | TMA method | | 8.1 | 9.2 | 7.8 | 7.8 |
| | Ink resistance | 121° C., 10 hr | Si elution (ppm) | ND | ND | ND | ND |
| | | | Alumina shedding | A | A | A | A |
| | | Further 121° C., 250 hr | Si elution (ppm) | 0.02 | 0.01 | ND | ND |
| | | | Alumina shedding | B | B | A | A |

R.C. represents Resin composition.

TABLE 2

| Material classification | Material name | Product name | Comparative example (parts) R.C. 10 | R.C. 11 | R.C. 12 | R.C. 13 | R.C. 14 |
|---|---|---|---|---|---|---|---|
| Epoxy resin | Naphthalene skeleton | NC-7300L (by Nippon Kayaku Co., Ltd.) Melting point: 74° C. | 100 | — | — | 100 | — |
| | Cresol novolac type | EOCN-1020 (by Nippon Kayaku Co., Ltd.) Melting point: 62° C. | — | 100 | — | — | 100 |
| | Triphenyl polyfunctional | EPPN-502H (by Nippon Kayaku Co., Ltd.) Melting point: 67° C. | — | — | 100 | — | — |

TABLE 2-continued

| | | | | | | | | |
|---|---|---|---|---|---|---|---|---|
| Curing agent | Phenol novolac | BRG-557 (by Aica SDK Phenol Co., Ltd.) Melting point: 86° C. | | 43 | 48 | 55 | 43 | 48 |
| Curing accelerator/ curing catalyst | Triphenylsulfone (TPP, Melting point: 80° C.) | | | 2 | 2 | 2 | 2 | 2 |
| Filler | Alumina median diameter: 20 μm | DMA-20 (by Denka Co., Ltd.) | | 900 | 930 | 976 | 514 | 530 |
| | Alumina median diameter: 5 μm | DMA-05A (by Denka Co., Ltd.) | | 386 | 400 | 416 | 386 | 400 |
| | Alumina (*silane treated) median diameter: 20 μm | DMA-20 (by Denka Co., Ltd.) | | — | — | — | — | — |
| | Alumina (*silane treated) median diameter: 5 μm | DMA-05A (by Denka Co., Ltd.) | | — | — | — | — | — |
| | Fused silica (*silane-treated) median diameter: 24 μm | FB-950 (by Denka Co., Ltd.) | | — | — | — | — | — |
| | Fused silica (*silane-treated) median diameter: 5 μm | FB-5D (by Denka Co., Ltd.) | | — | — | — | 386 | 400 |
| | Alumina (*silane treated) median diameter: 0.6 μm | AO-502 (by Admatechs Co., Ltd.) | | — | — | — | — | — |
| Flow improver | Carnauba wax | Carnauba wax (by Cerarica NODA Co., Ltd.) | | 2 | 2 | 2 | 2 | 2 |
| | Total amount (parts) | | | 1433 | 1482 | 1551 | 1433 | 1482 |
| | Total amount of filler (parts) | | | 1286 | 1330 | 1392 | 1286 | 1330 |
| | Filler content (mass %) | | | 89.7 | 89.7 | 89.7 | 89.7 | 89.7 |
| Alumina and silica | Alumina:silica (mass ratio) | | | — | — | — | 7:3 | 7:3 |
| | Number of alumina parts per silica 100 parts | | | — | — | — | 233 | 233 |
| Alumina A and silica | Alumina A:silica (mass ratio) | | | — | — | — | — | — |
| | Number of parts of alumina A per 100 silica parts | | | — | — | — | — | — |
| Evaluation | Tg(° C.) | TMA method | | 143 | 153 | 170 | 170 | 170 |
| | CTE($\times 10^{-6}$° C.$^{-1}$) | TMA method | | 14.9 | 14.8 | 14.3 | 9.4 | 9.3 |
| | Ink resistance | 121° C., 10 hr | Si elution (ppm) | ND | ND | ND | 1.7 | 1.4 |
| | | | Alumina shedding | A | A | A | A | A |
| | | Further 121° C., 250 hr | Si elution (ppm) | ND | ND | ND | — | — |
| | | | Alumina shedding | C | C | B | — | — |

| Material classification | Material name | Product name | | Comparative example (parts) R.C. 15 | R.C. 16 | R.C. 17 | R.C. 18 |
|---|---|---|---|---|---|---|---|
| Epoxy resin | Naphthalene skeleton | NC-7300L (by Nippon Kayaku Co., Ltd.) Melting point: 74° C. | | — | — | — | — |
| | Cresol novolac type | EOCN-1020 (by Nippon Kayaku Co., Ltd.) Melting point: 62° C. | | — | — | — | — |
| | Triphenyl polyfunctional | EPPN-502H (by Nippon Kayaku Co., Ltd.) Melting point: 67° C. | | 100 | 100 | 100 | 100 |
| Curing agent | Phenol novolac | BRG-557 (by Aica SDK Phenol Co., Ltd.) Melting point: 86° C. | | 55 | 55 | 55 | 55 |
| Curing accelerator/ curing catalyst | Triphenylsulfone (TPP, Melting point: 80° C.) | | | 2 | 2 | 2 | 2 |
| Filler | Alumina median diameter: 20 μm | DMA-20 (by Denka Co., Ltd.) | | 560 | 560 | — | — |
| | Alumina median diameter: 5 μm | DMA-05A (by Denka Co., Ltd.) | | 416 | 595 | — | — |
| | Alumina (*silane treated) median diameter: 20 μm | DMA-20 (by Denka Co., Ltd.) | | — | — | 277 | — |
| | Alumina (*silane treated) median diameter: 5 μm | DMA-05A (by Denka Co., Ltd.) | | — | — | — | 106 |
| | Fused silica (*silane-treated) median diameter: 24 μm | FB-950 (by Denka Co., Ltd.) | | — | — | 1155 | 1314 |
| | Fused silica (*silane-treated) median diameter: 5 μm | FB-5D (by Denka Co., Ltd.) | | 416 | 277 | — | — |
| | Alumina (*silane treated) median diameter: 0.6 μm | AO-502 (by Admatechs Co., Ltd.) | | — | — | — | — |
| Flow improver | Carnauba wax | Carnauba wax (by Cerarica NODA Co., Ltd.) | | 2 | 2 | 2 | 2 |
| | Total amount (parts) | | | 1551 | 1591 | 1591 | 1591 |
| | Total amount of filler (parts) | | | 1392 | 1432 | 1432 | 1432 |
| | Filler content (mass %) | | | 89.7 | 90.0 | 90.0 | 90 |
| Alumina and silica | Alumina:silica (mass ratio) | | | 7:3 | 8:2 | 1:9 | 0.7:9.3 |
| | Number of alumina parts per silica 100 parts | | | 235 | 417 | 24 | 8 |
| Alumina A and silica | Alumina A:silica (mass ratio) | | | — | — | — | — |
| | Number of parts of alumina A per 100 silica parts | | | — | — | — | 8 |
| Evaluation | Tg(° C.) | TMA method | | 170 | 170 | 170 | 170 |
| | CTE($\times 10^{-6}$° C.$^{-1}$) | TMA method | | 8.9 | 9.2 | 7.8 | 7.4 |
| | Ink resistance | 121° C., 10 hr | Si elution (ppm) | 1.6 | 1.1 | 2.7 | 0.03 |
| | | | Alumina shedding | A | A | A | A |
| | | Further 121° C., 250 hr | Si elution (ppm) | — | — | — | — |
| | | | Alumina shedding | — | — | — | — |

R.C. represents Resin composition.

Resin compositions 1 to 9 of the examples contain 11 parts by mass or more of alumina (i.e. alumina A) having a median diameter of ¼ or less of the median diameter of silica, relative to 100 parts by mass of silica. Therefore, no elution of silica into the ink or shedding of alumina was observed even upon heating at 121° C. for 10 hours in a PCT, and also CTE was from $7.5\times10^{-6}$° C.$^{-1}$ to $9.4\times10^{-6}$° C.$^{-1}$. Neither silica elution nor alumina shedding could be observed in Resin composition 8 or 9, in which both alumina and silica had been silane-treated, even after further heating at 121° C. for 250 hours in a PCT.

Resin compositions 10 to 12 of the comparative examples contain only alumina as a filler, as in the examples of Japanese Patent Application Publication No. 2019-142213, and hence the CTE, from $14.3\times10^{-6}$° C.$^{-1}$ to $14.9\times10^{-6}$° C.$^{-1}$, is higher than the CTE of the resin compositions of the examples.

In Resin compositions 13 to 16 the median diameter of the silica was small, and accordingly the filler did not contain alumina A, nor was the filler arranged so that silica was enveloped by alumina A; hence, elution of silica was observed after heating at 121° C. for 10 hours in a PCT. In Resin composition 17 the median diameter of alumina was ⅚ the median diameter of silica, and hence the filler was not disposed so that silica was enveloped by alumina A, and elution of silica was observed after heating at 121° C. for 10 hours in a PCT. Resin composition 18 contains alumina A having a median diameter of ¼ or less of the median diameter of silica; however, the content of alumina A is less than 11 parts by mass relative to 100 parts by mass of silica, and accordingly there is no arrangement such that silica is enveloped with alumina A. As a result, elution of silica was observed after heating at 121° C. for 10 hours in a PCT.

The present disclosure uses a filler in the form of silica, which has a low CTE but elutes readily into in the ink, and alumina, which has a high CTE but does not readily elute into the ink, as compared with silica. By controlling the median diameter and the content of silica and of alumina an arrangement is made possible in which the silica is enveloped by alumina, and elution of silica into the ink can be suppressed. Since elution of silica into the ink is thus suppressed there can be formulated a larger amount of silica of low CTE, as a result of which a flow channel member of an inkjet recording head is realized that has a low CTE and in which elution of silica into the ink is suppressed.

An explanation follows next, with reference to the schematic diagrams illustrated in FIGS. 4A to 4C and FIGS. 5A to 5C, on a concrete example in which a member having an ejection function of a recording element is formed using the molding material of the present disclosure.

Figure 4A:
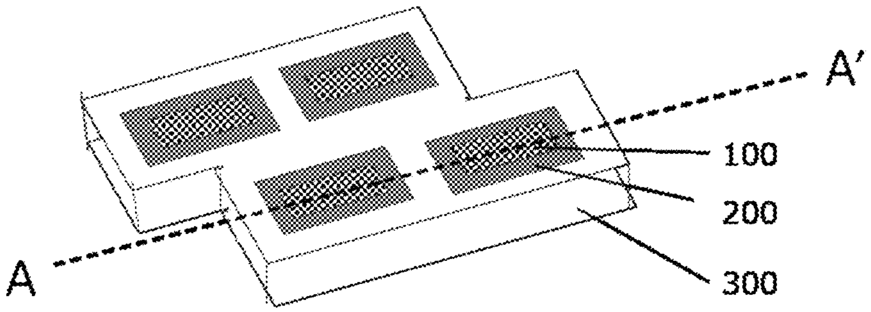
FIGS. 4A to 4C are explanatory diagrams of an inkjet recording head according to a conventional aspect.
Figure 4B:
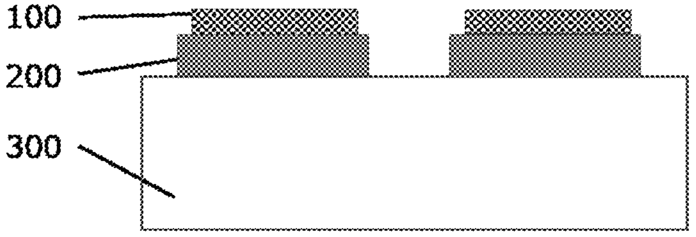
Figure 4C:
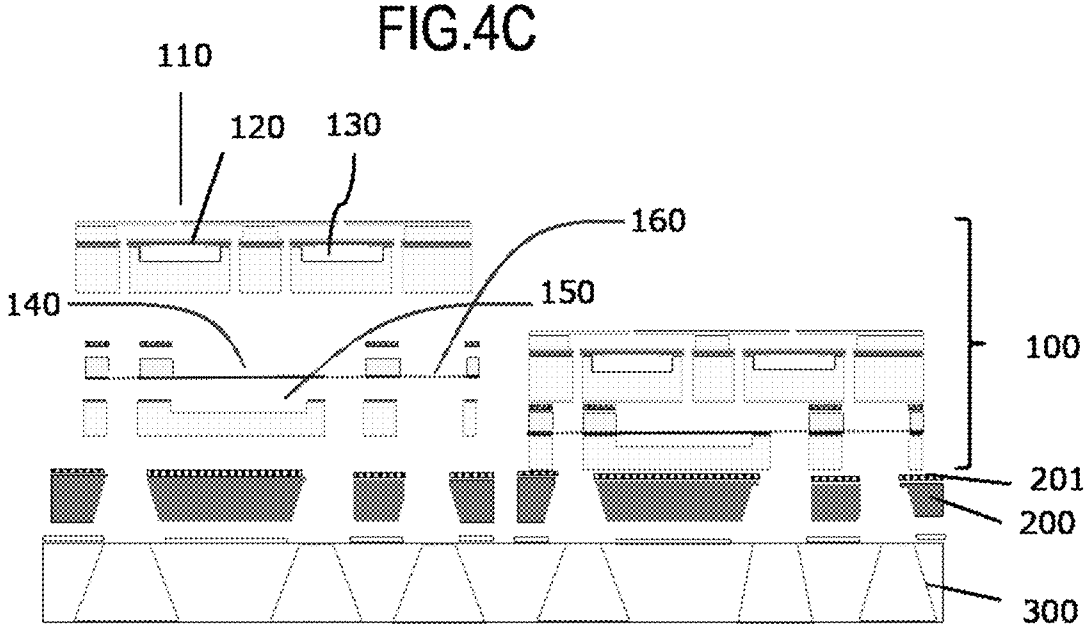

FIGS. 4A to 4C are explanatory diagrams of an inkjet recording head according to a conventional aspect.

FIG. 4A is a perspective-view diagram of a piezo head unit. FIG. 4B is a side-view diagram of the piezo head unit. FIG. 4C is an exploded-view diagram of a cross section of FIG. 4A along dashed line A-A'. The trapezoidal region of the dotted line in the base plate 300 of FIG. 4C denotes a hole formed in the base plate.

As illustrated in FIG. 4C, each recording element 100 is formed using three members, namely a substrate provided with an ejection port 110, a piezoelectric element 120, and a pressure chamber 130; a substrate provided with a buffer film 140 (straight solid line portion of the leader line drawn in FIG. 4C) and a filter 160 (dashed line in FIG. 4C); and a substrate provided with a buffer chamber 150. These members are produced by photolithography and laser processing, and are joined to a flow channel substrate 200 for instance via an adhesive 201, with subsequent joining to the base plate 300.

FIGS. 5A to 5C are explanatory diagrams of an inkjet recording head according to one aspect of the present disclosure.

FIG. 5A is a perspective-view diagram of a piezo head unit. FIG. 5B is a side-view diagram of the piezo head unit. FIG. 5C is an exploded-view diagram of a cross section of FIG. 5A along dashed line A-A'. The trapezoidal region of the dotted line in the base plate 500 of FIG. 5C denotes a hole formed in the base plate.

As illustrated in FIG. 5C, a recording element 400 is formed, for instance by photolithography using a silicon substrate, through the use of two members in the form of a substrate provided with an ejection port 410, a piezoelectric element 420 and a pressure chamber 430, and a substrate provided with a buffer film 440 and a filter 460.

The base plate 500 having a shape including a depressed portion of the buffer chamber 450 and a flow channel substrate was molded using the molding material according to Resin compositions 1 to 9. The size of the depressed portion was set to a depth (length of the inner wall of the buffer chamber in the vertical direction, with the piezo head unit set on the horizontal plane) of 75 μm, a length (length of the inner wall of the buffer chamber in the longitudinal direction of the base plate (i.e. the direction of the dashed line A-A' in FIG. 5A)) of 400 μm, and a width (length of the inner wall of the buffer chamber in a direction perpendicular to both the depth direction and the length direction) of 3000 μm.

Such molding is possible by virtue of the fact that the present molding material allows for precision molding and can be molded into a complex three-dimensional structure.

Further, the molded base plate was joined to the above two members, using an adhesive 401.

Thus, the number of parts is reduced, the number of joints is likewise reduced, and the dimensional tolerances of the individual members are reduced, all of which results in higher reliability and higher printing precision.

A buffer chamber has been illustrated in the present embodiment, but the embodiment is not particularly limited thereto, and although not described herein, the embodiment may be applied also to an ink chamber and a pressure chamber.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-114478, filed Jul. 9, 2021, and Japanese Patent Application No. 2022-010686, filed Jan. 27, 2022, which are hereby incorporated by reference herein in their entirety.

What is claimed is:

1. An inkjet recording head comprising a flow channel member, wherein the flow channel member is formed of a heat-cured product of a molding material comprising a resin composition comprising a thermosetting epoxy resin and a curing agent, and a filler;

the filler comprises alumina and silica; and with d50 as a median diameter of the silica and with alumina A as the alumina having a median diameter of d50/4 or less, a content of the alumina A is 11 parts by mass or more relative to 100 parts by mass of the silica.

2. The inkjet recording head according to claim 1, wherein the content of the alumina A is 15 parts by mass or more relative to 100 parts by mass of the silica.

3. The inkjet recording head according to claim 1, wherein the content of the alumina is 420 parts by mass or less relative to 100 parts by mass of the silica.

4. The inkjet recording head according to claim 1, wherein both the thermosetting epoxy resin and the curing agent are polyfunctional.

5. The inkjet recording head according to claim 1, wherein both the thermosetting epoxy resin and the curing agent are phenolic resins having a melting point of 50° C. or higher.

6. The inkjet recording head according to claim 1, wherein at least one selected from the group consisting of the alumina and the silica is treated with a silane coupling agent.

7. The inkjet recording head according to claim 6, wherein both the alumina and the silica are treated with the silane coupling agent.

8. The inkjet recording head according to claim 1, wherein the flow channel member is a base plate for supporting a recording element substrate.

9. The inkjet recording head according to claim 8, wherein the base plate has a depressed portion.

10. The inkjet recording head according to claim 1, wherein the thermosetting epoxy resin is a triphenyl-type epoxy resin.

11. The inkjet recording head according to claim 1, wherein a content of the filler in the heat-cured product is 70.0 to 92.0 mass %.

12. The inkjet recording head according to claim 1, wherein a content of the filler in the heat-cured product is 85.0 to 91.0 mass %.

13. The inkjet recording head according to claim 1, comprising a member having an ejection function; and the member having the ejection function is formed of the heat-cured product.

14. A method for producing an inkjet recording head comprising a flow channel member, wherein the method has a step of forming the flow channel member through injection molding of a molding material comprising a resin composition comprising a thermosetting epoxy resin and a curing agent, and a filler;

the filler comprises alumina and silica; and with d50 as a median diameter of the silica and with alumina A as the alumina having a median diameter of d50/4 or less, a content of the alumina A is 11 parts by mass or more relative to 100 parts by mass of the silica.

15. The method for producing the inkjet recording head according to claim 14, wherein in the step of forming the flow channel member, a segment eliciting an ejection function is provided, to make the flow channel member into a member having an ejection function.

* * * * *